Oct. 11, 1932.          K. E. LYMAN          1,881,771
THERMOSTATIC CONTROL DEVICE FOR OIL COOLERS
Filed Dec. 22, 1930
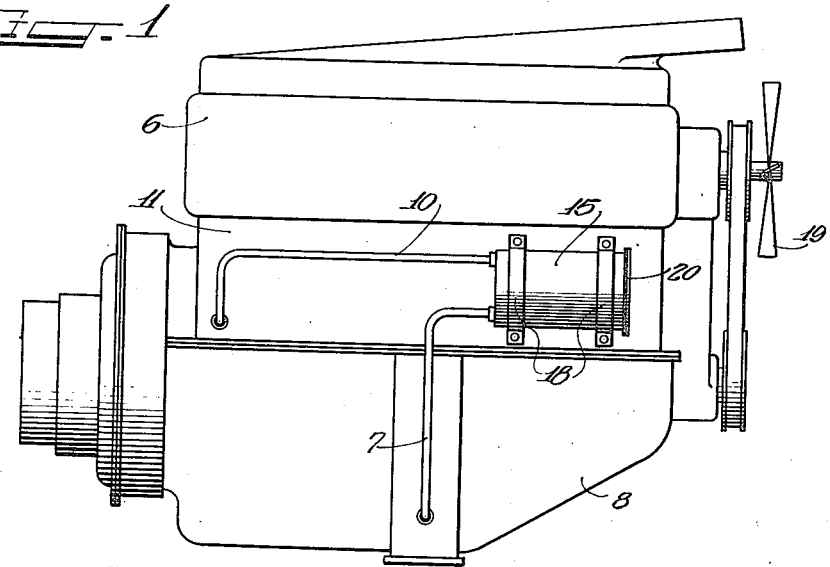
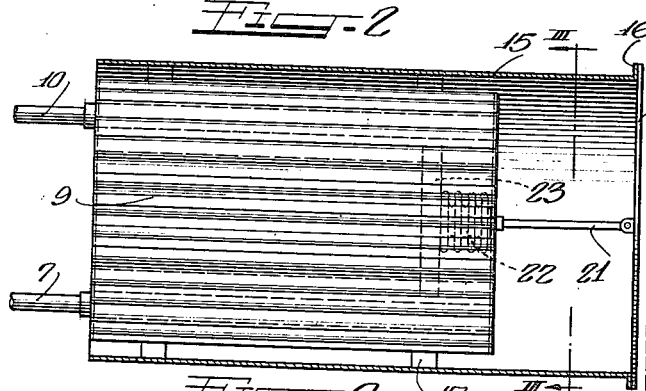
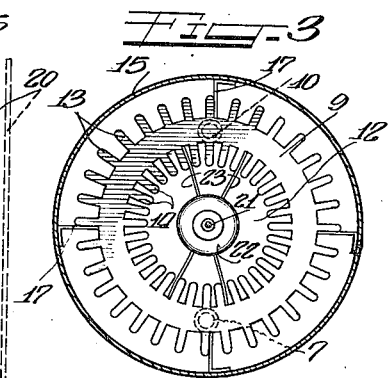
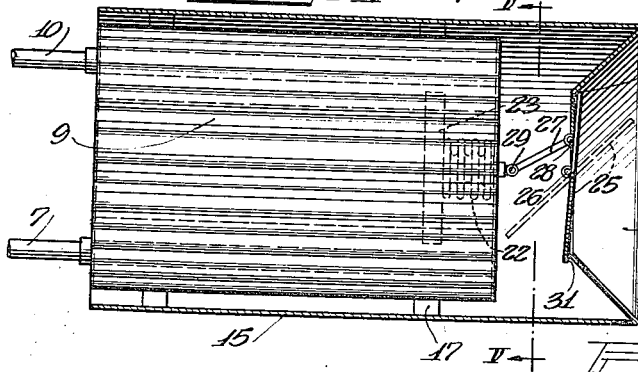
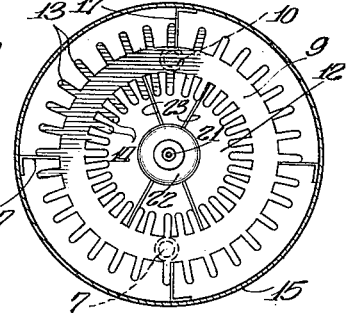
Inventor:
Kenneth E. Lyman
by: Charles T. Hills Attys.

Patented Oct. 11, 1932

1,881,771

UNITED STATES PATENT OFFICE

KENNETH E. LYMAN, OF CHICAGO, ILLINOIS, ASSIGNOR TO BORG-WARNER CORPORATION, OF CHICAGO, ILLINOIS, A CORPORATION OF ILLINOIS

THERMOSTATIC CONTROL DEVICE FOR OIL COOLERS

Application filed December 22, 1930. Serial No. 504,052.

This invention relates to improvements in control means for fluid cooling devices, and more particularly to a thermostatic control means for governing the draft or passage of air over heat dissipating surfaces of fluid coolers, although the invention may have many and various uses and purposes as will be apparent to one skilled in the art.

In the past, many and various devices or means have been developed for the cooling of fluid, and, while these devices have in many instances operated with the contemplated efficiency, it is obviously illogical to permit cooling means to function when the fluid cooled thereby is already below a desired temperature. The foregoing is especially true when the cooling means are used in connection with the lubricant coolers installed in connection with various mechanisms requiring a constant lubricant supply. For example, lubricant coolers are commonly used in connection with internal combustion engines, especially automotive engines, and when the engine is started in cold weather or under conditions where the lubricant is below the desired temperature for proper operation of the engine, it is unwise to subject the lubricant to cooling means since it is always desirable to raise the temperature of the engine to the top or operating range as expeditiously as possible. It is, therefore, found desirable to control the cooling means in such a manner that the oil or other lubricant will be permitted to promptly acquire a temperature within a predetermined range, and then throughout subsequent operation of the engine, the cooling means will maintain the temperature of the oil within the said predetermined range.

With the foregoing in mind, as well as other desirable ends more apparent hereinafter, it is an object of the present invention to provide means for automatically controlling the cooling capacity of fluid cooling means.

It is also an object of this invention to provide means for automatically controlling the draft or passage of air over cooling means having heat dissipating surfaces.

Another object of this invention is the provision of means disposable adjacent a fluid cooler in position to shield the cooler from draft, the means being automatically adjustable in accordance with temperature variations to permit drafts of varying degrees over the cooling means or to altogether prevent such drafts.

It is a further object of the present invention to provide means for controlling the draft passing over a fluid cooler, the means being automatically operable by means of a thermostatic unit functioning in accordance with variations in temperature of the fluid cooler.

While some of the more salient features, characteristics, and advantages of means embodying the present invention have been above pointed out, others will become apparent from the following disclosures.

The invention includes these and other features of construction and combinations of parts hereinafter described, and shown in a preferred form in the drawing, as more particularly indicated by the claims.

On the drawing:

Figure 1 is an elevational view of an internal combustion engine equipped with a lubricant line and a lubricant cooler therein, and controlling means embodying principles of the present invention.

Figure 2 is an enlarged fragmentary, part vertical sectional, part elevational, view of the controlling means associated with the oil cooler.

Figure 3 is a vertical sectional view taken substantially as indicated by the line III—III of Figure 2.

Figure 4 is a view similar to Figure 2 showing a slightly different form of construction of the control means.

Figure 5 is a vertical sectional view taken substantially as indicated by the line V—V of Figure 4.

As shown on the drawing:

In the illustrated embodiment of the present invention, there is shown an internal combustion engine 6 of the type commonly used in automobiles and similar vehicles, equipped with a lubricating system including a conduit 7 leading from the crank case 8 of the engine to the intake port of an oil cooler 9, and a conduit 10 leading from the outlet port of the cooler to the cylinder block 11 of the engine.

The oil cooler 9 may be of any desired character, but is preferably a combined oil cooler and filter of the character set forth and claimed in my co-pending application for United States Letters Patent entitled "Oil cooler and filter", Serial No. 481,394, filed September 12, 1930. In the present instance, the cooler 9 is cylindrical as well as toroidal in shape, having a longitudinal central opening 12 extending entirely therethrough, and provided on the exterior surface with a plurality of spaced fins or vanes 13 extending substantially radially outward and longitudinally substantially the full length of the cooler, and on the inner exterior surface a plurality of spaced fins or vanes 14 of similar character project into the opening 12. The various vanes obviously provide cooling surfaces over which a draft of air may pass and aid the cooler in dissipating heat taken from the oil.

The means for controlling the cooling capacity of the cooler 9, in this instance, with reference now to Figures 1, 2, and 3, comprise an open-ended casing or tubular member 15 of substantially the same general exterior shape of the cooler with which it is associated, the forward end of the casing being turned outwardly to provide an annular flange 16 substantially at right angles to the casing. This casing is disposed around the cooler 9 in spaced relationship thereto, so as to leave a passage between the casing and cooler for drafts of air, the casing being preferably attached to the cooler by means of a plurality of brackets 17 spot-welded or otherwise secured to one of the fins 13 and adjacent the other end thereof the brackets are secured in similar manner to the inner wall of the casing. The casing and cooler are both supported by means of a pair of spaced straps 18 bolted or otherwise secured to the cylinder block of the engine, preferably adjacent the forward portion thereof in the path of the draft created by the engine fan 19, although the cooler and controlling means will function with great efficiency in any desirable location.

The casing 15 preferably projects beyond the forward end of the cooler and is provided at its forward end with a movable closure 20 of a size sufficient to correspond with the outer dimensions of the flange 16 on the casing. The closure 20 is connected in any suitable manner, preferably rigidly, to a reciprocable actuating bar 21 which is in turn connected to the forward end of a thermostatic unit 22 which, in this instance, is a well-known expansible bellows-like member, commonly referred to as a "sylphon" or "sylphonic diaphragm". The thermostatic unit is held in position by means of a pair of crossed supports 23 each secured at each end thereof as by welding or in any other desired manner to one of the fins 14 on the cooler, and the thermostatic unit is secured to these crossed supports at its rear end, whereby the supports will only permit the thermostatic unit to expand forwardly.

It will be noted that the thermostatic unit 22 is preferably disposed within the passage 12 through the cooler, in which location the thermostatic unit will be subjected to substantially the same temperature occurrent on the surface and within the cooler when the closure or damper is closed, and subjected to both this temperature and that of the air passing through when the damper is open, so that the thermostatic unit will respond very closely to temperature changes of the oil.

In operation, the present invention is extremely simple, and yet highly sensitive to temperature changes and exceedingly accurate in results.

Assuming now that the oil in the lubricating system is cold or below the predetermined range of temperature in which it is desired to maintain the oil during the operation of the engine, the thermostatic element 22, being subjected to the same temperature substantially as that of the oil, will be in a contracted position with the closure 20 in abutment with the flange 16, thus cutting off the draft over the cooler 9, so that the cooler will have extreme difficulty in dissipating any heat taken from the oil. As the temperature of the oil increases up to and above the predetermined range, the thermostatic unit 22 expands and pushes the closure outwardly away from the flange 16 substantially as indicated by the dotted lines in Figure 2, thereby admitting a draft of air through the passage between the casing and cooler 9. Thus, the passage of air or draft over the heat-dissipating surfaces of the cooler is automatically varied in accordance with variations in temperature of the oil, and the oil is automatically maintained within the predetermined range of operating temperature.

In Figures 4 and 5 I have shown a slightly different form of the control means, the only difference between this form and that previously described herein residing in the front end of the casing 15, the closure member, and a slight change in the actuating bar leading from the thermostatic unit. Otherwise, the structure and mounting means are identical with those described hereinabove.

In this instance, the forward end of the casing 15 is turned inwardly at an angle to provide a funnel-like entrance opening 24. A damper-type closure 25 is provided for the opening in the funnel portion 24 and pivoted on a diametrically disposed pivot pin 26. Preferably, at a point above the pivot pin 26, an operating bar 27 is pivotally connected as at 28 to the damper 25, and the operating bar is pivotally connected as at 29 to the front portion of the thermostatic unit 22. The damper closure itself is preferably shaped so that the upper edge thereof will project slightly above the opening in the funnel portion 24 on the exterior side thereof as at 30, and the lower portion thereof will project slightly below the funnel portion 24 on the inside thereof as at 31, thus insuring a tight closure when the thermostatic unit is contracted.

The operation of the structure shown in Figures 4 and 5 is substantially the same as that of the structure shown in Figures 2 and 3, the damper 25 pivoting in accordance with the expansions and contractions of the thermostatic unit substantially as indicated by the dotted lines in Figure 4.

Of course, while the oil cooler and control means are shown and described herein as having a substantially cylindrical shape, it is obvious that any desired shape may be employed for these various elements without departing from the spirit of this invention, it is also obvious that any desirable kind or character of thermostatic control may be utilized without departing from the spirit of this invention, the thermostatic diaphragm that is shown and described herein being a standard, well-known article.

From the foregoing, it is apparent that I have provided control means for fluid coolers, which control means function to vary the cooling capacity of the cooler in accordance with temperature variations of the fluid therein. It is also apparent that the present invention will function quickly and accurately to maintain the temperature of the fluid passing through the cooler within a desired range, and the control means will also aid the said fluid in reaching the desired temperature range in an expeditious manner when initially below that range. Furthermore, the present invention is simple in construction, readily and easily installed, durable, necessitates little, if any, repairs, and may be economically manufactured.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. As an article of manufacture, a control device for a cooler having a heat dissipating surface, including an open-ended casing for disposition around said cooler, a closure movable to vary the opening in an end of said casing, and a thermostatic element in said casing and connected to said closure for moving the same in accordance with temperature variations.

2. As an article of manufacture, a control device for a cooler having a heat dissipating surface, including an open-ended casing for disposition around a cooler, a closure for an end of said casing, and a thermostatic unit in said casing mountable adjacent said cooler and connected with said closure to reciprocate the latter to vary the draft through said opening.

3. As an article of manufacture, a control device for a cooler having a heat dissipating surface, including an open-ended casing for disposition around a cooler, the forward end of said casing being turned inwardly at an angle to reduce the opening in said end, a damper in said casing for closing and opening said forward end, and a thermostatic unit in said casing and connected to said damper for controlling the same to vary the draft over said cooler in accordance with temperature changes.

4. In combination, a cooler having a substantially central opening therein and provided with a heat dissipating surface, and a control for said cooler including means mounted in advance of said cooler on the air inlet side thereof, said means having an opening therein, a movable closure for said opening, and a thermostatic unit mounted in the opening in said cooler and connected to said closure for controlling the latter to vary the draft over said cooler.

5. As an article of manufacture, a control device for a cooler having a heat dissipating surface, including a casing having opposed openings therein, the forward end of said casing being turned inwardly to reduce the opening in said end, means for closing said forward end opening, and means responsive to temperature changes for varying said first said means.

In testimony whereof I have hereunto subscribed my name at Chicago, Cook County, Illinois.

KENNETH E. LYMAN.